United States Patent [19]
Richard

[11] Patent Number: 5,234,240
[45] Date of Patent: Aug. 10, 1993

[54] STRATIFIED ROLL POSITIONING APPARATUS

[76] Inventor: Mark Richard, Rt. 1, Box 527, Hwy. 347, Arnaudville, La. 70512

[21] Appl. No.: 918,754

[22] Filed: Jul. 27, 1992

[51] Int. Cl.⁵ .............................................. B65G 7/12
[52] U.S. Cl. ......................................... 294/15; 254/131; 294/4
[58] Field of Search .................. 294/4, 15–17, 294/26, 62, 92, 104, 113; 81/90.1, 90.3, 90.9, 91.2, 91.3, 92, 98, 176.1–176.3; 105/129; 254/15, 35, 36, 38, 43, 44, 113, 119–121, 123, 131

[56] References Cited

U.S. PATENT DOCUMENTS

| | | | |
|---|---|---|---|
| 133,157 | 11/1872 | Kenney | 105/129 |
| 163,486 | 5/1875 | Hardy | 294/17 X |
| 300,733 | 6/1884 | Preston | 105/129 X |
| 392,752 | 11/1888 | Rankins | 294/17 |
| 394,628 | 12/1888 | Wiley | 105/129 |
| 542,922 | 7/1895 | Brock | 81/176.2 |
| 724,437 | 4/1903 | Clary | 105/129 |
| 788,560 | 5/1905 | Smith et al. | 294/17 X |
| 1,082,452 | 12/1913 | Stackhouse | 254/131 |
| 1,401,046 | 12/1921 | Clymer | 294/15 |
| 1,504,847 | 8/1924 | Tarr | 81/176.3 |
| 1,529,131 | 3/1925 | Jenkins | 81/98 |
| 1,805,381 | 5/1931 | Shimko | 294/17 X |
| 2,083,388 | 6/1937 | Moore | 294/16 X |
| 2,793,065 | 5/1957 | McCurry | 294/16 |
| 3,436,778 | 4/1969 | Stevens et al. | 294/15 X |

FOREIGN PATENT DOCUMENTS

| | | | |
|---|---|---|---|
| 493470 | 3/1930 | Fed. Rep. of Germany | 294/15 |
| 159082 | 6/1957 | Sweden | 294/16 |
| 8123 | 2/1904 | United Kingdom | 81/91.2 |
| 183047 | 7/1922 | United Kingdom | 81/176.3 |

*Primary Examiner*—Johnny D. Cherry
*Attorney, Agent, or Firm*—Robert Montgomery

[57] ABSTRACT

A manual tool for rolling and positioning a mass of material. More particular, for use with rolls of stratified materials having a central core. The tool when inserted into the central core of such stratified rolls articulates in a manner so as to allow a cleat member to grip the outer perimeter of the roll and thereby allows the workman to apply leverage to the mass causing rotation. Repeated articulated movements allows the tool to be operated in a ratcheting manner.

11 Claims, 4 Drawing Sheets

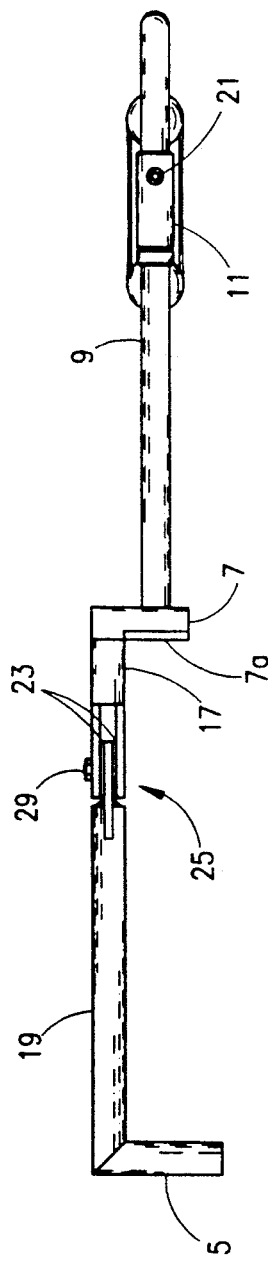
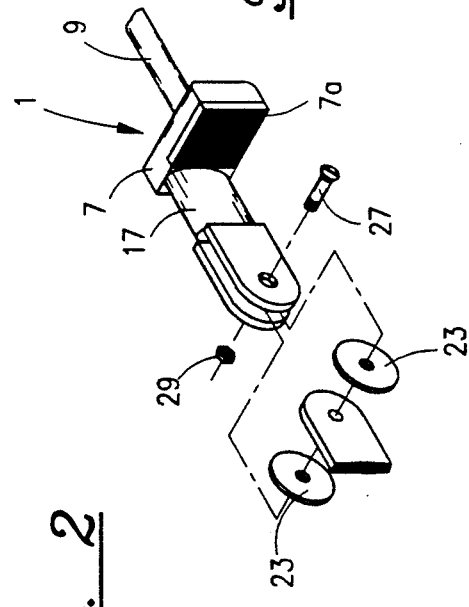
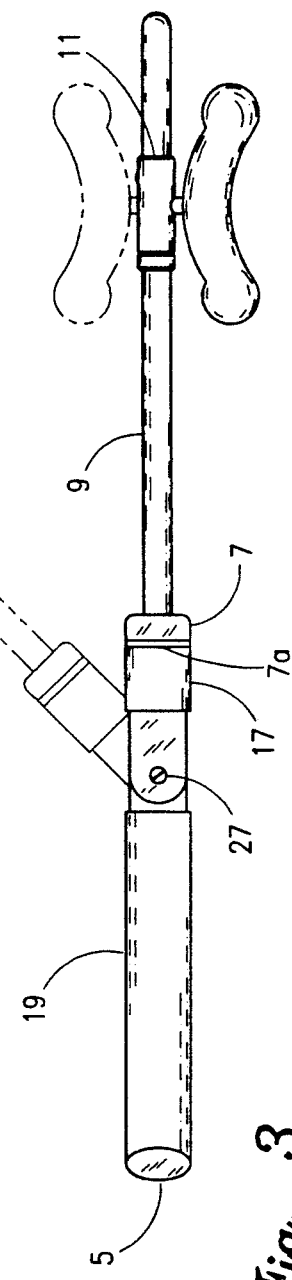

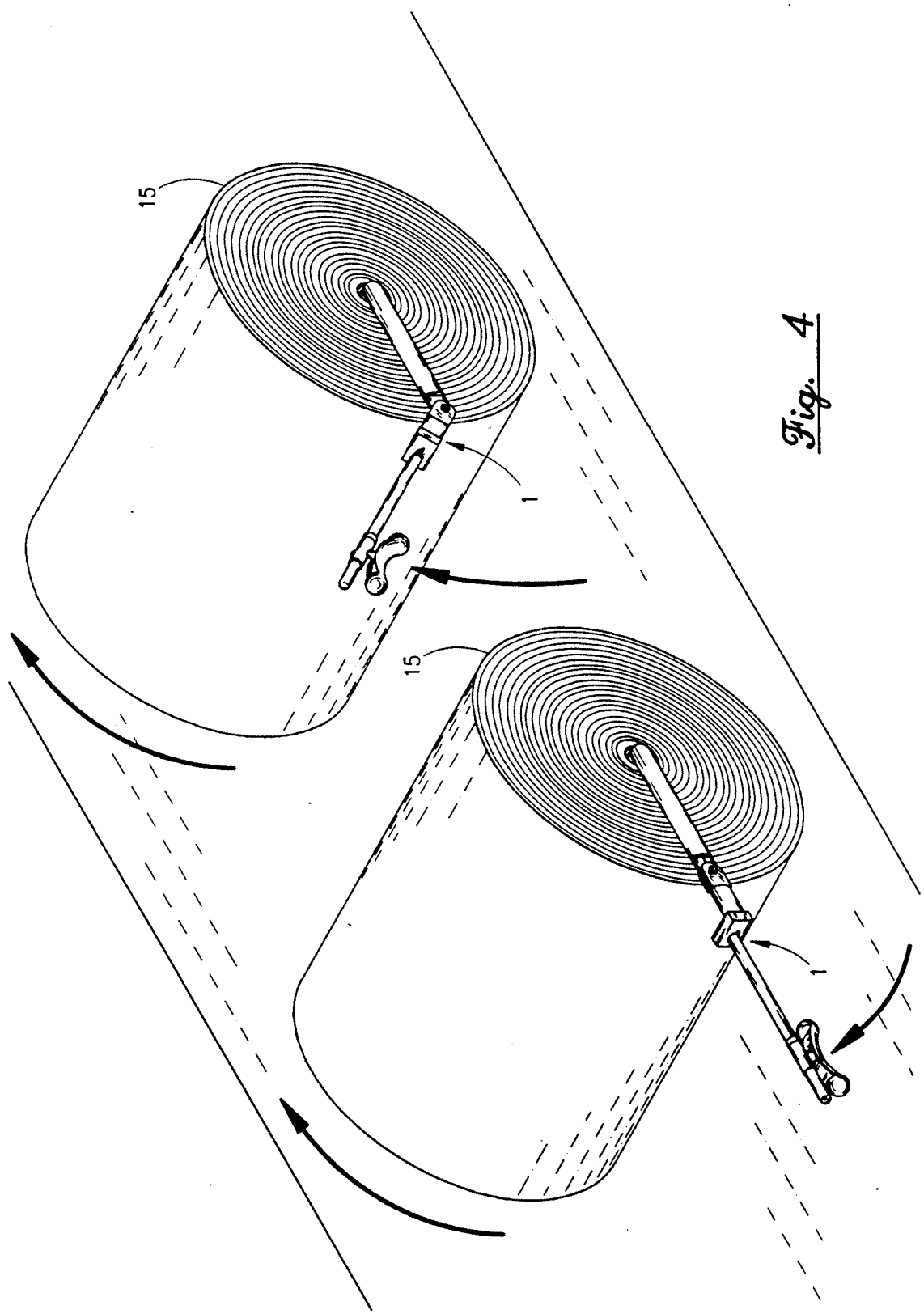

STRATIFIED ROLL POSITIONING APPARATUS

BACKGROUND OF THE INVENTION

1. Field of the Invention

The present invention relates to specialty tools and, more particularly, to tools used to manually manipulate and position heavy tubular goods or large stratified rolls of material having an open center core.

2. General Background

Hand tools are widely used to multiply the power of a man's strength. Levers are most often used to provide such multiplication. Leverage can be increased again by using pivots. Thus, fulcrums in the form of cant hooks or jack levers have been developed and are used to manually move and position large bodies, such as trees, power poles, etc. Pry or pinch bars are sometimes used to skid or roll very heavy bodies. Hand tools have been used to tighten or loosen caps and every conceivable type of fastener devised by man. However, there does not seem to be anything that combines these principles.

Man often expresses his superior intellect by his ability to make and utilize tools to satisfy a need of his own making. When man finds a task to be inefficient, from an energy standpoint, he will set about trying to correct the problem, especially if the energy source is his own body.

During the course of manufacturing sheet materials, they are, by necessity, stratified onto spindles. Such stratified materials are then removed from the spindles leaving a hollow axial core. Such materials include paper, cloth, plastics, carpeting, foam and ceramic sheets. Other products too are often stratified onto reels, for example wire, rope, and rubber belting etc.

Products manufactured in the above manner must be moved about within the supplier's manufacturing facility onto commercial transport vehicles, removed from such vehicles and then often moved several times within a manufacturing facility before an end product is finally produced. In many cases mechanized moving equipment is not available or cannot be utilized in tight, confined spaces such as inside vehicle's cargo containers, etc. In such instances sheer manpower must be relied upon to move and position the rolls of stratified materials, some having great bulk and weighing several hundreds of pounds.

In most cases, the object of a hand tool used to move such stratified rolls is to skid, roll or rotate the mass by prying or otherwise torquing. However, no attempt is made to control the mass once it is in motion. Further complications occur when the mass is round, offering no means of attachment for the tool or the tool itself may cause serious damage to the material being moved.

The use of air or hydraulic tools are employed in many cases to handle such goods. However, such tools are expensive, subject to frequent failure, awkward to use, take considerably more time to use, and are seldom available when and where they are needed.

SUMMARY OF THE PRESENT INVENTION

Although the present invention may be utilized in several industries, disclosure will be limited to a single example.

The manual rolling movement and positioning of stratified rolls or any other circular mass having a hollow central core or, at least, having a partial central bore could be simplified with the present invention, thus, reducing personal injury and muscle fatigue.

A particular application for the tool described herein would be the Kraft paper and corrugated box industry. The Kraft paper rolls must be moved manually and by mechanized equipment at the paper mill, placed in shipping containers and transported to a bag or box plant where they are moved to a warehouse and again to the gluing or corrugating machines which convert the Kraft paper into bags or laminated boards for paper boxes. Gluing and/or corrugating machines are usually continuous feed machines, comprising multiple roll stands which roll in and out of the machine at each of several stations, which allow for the automatic gluing and slicing of the paper. The various gauge paper rolls are placed near each station by forklift. The operators must then position the rolls which measure approximately 58 inches in diameter and between 48 to 88 inches long, onto the roll stands, usually maneuvering them over a distance of several feet on uneven flooring. When the machines are running at maximum capacity, the operators are often required to be maintaining as many as five roll stands at a time. Thus, there is little time to be spent securing, moving and positioning bulky handling equipment such as air or hydraulic rolling tools. Thus, the rolls are usually moved manually. Mechanized equipment is used only when absolutely essential.

Accordingly, it is an object of the present invention to provide a lightweight hand-manipulated tool for positioning and rolling large-diameter stratified rolls of material.

It is a further object of the present invention to provide a tool, pivotal about the center core of a stratified roll or diametrical body, for rotating the body over a flat surface or about a central axis.

It is yet another object of the present invention to provide a tool for rolling large-diameter bodies without significantly marring their outer surface.

BRIEF DESCRIPTION OF THE DRAWINGS

FIG. 2 is a side elevation view of the present invention.

FIG. 2a is an exploded view of the upper bar and clevis assemble.

FIG. 3 is a plan view of the present invention.

FIG. 4 is an isometric view of the present invention in use with a stratified roll of material, showing the tool's articulated engagement.

DETAILED DESCRIPTION OF THE PREFERRED EMBODIMENT

Figure 1:
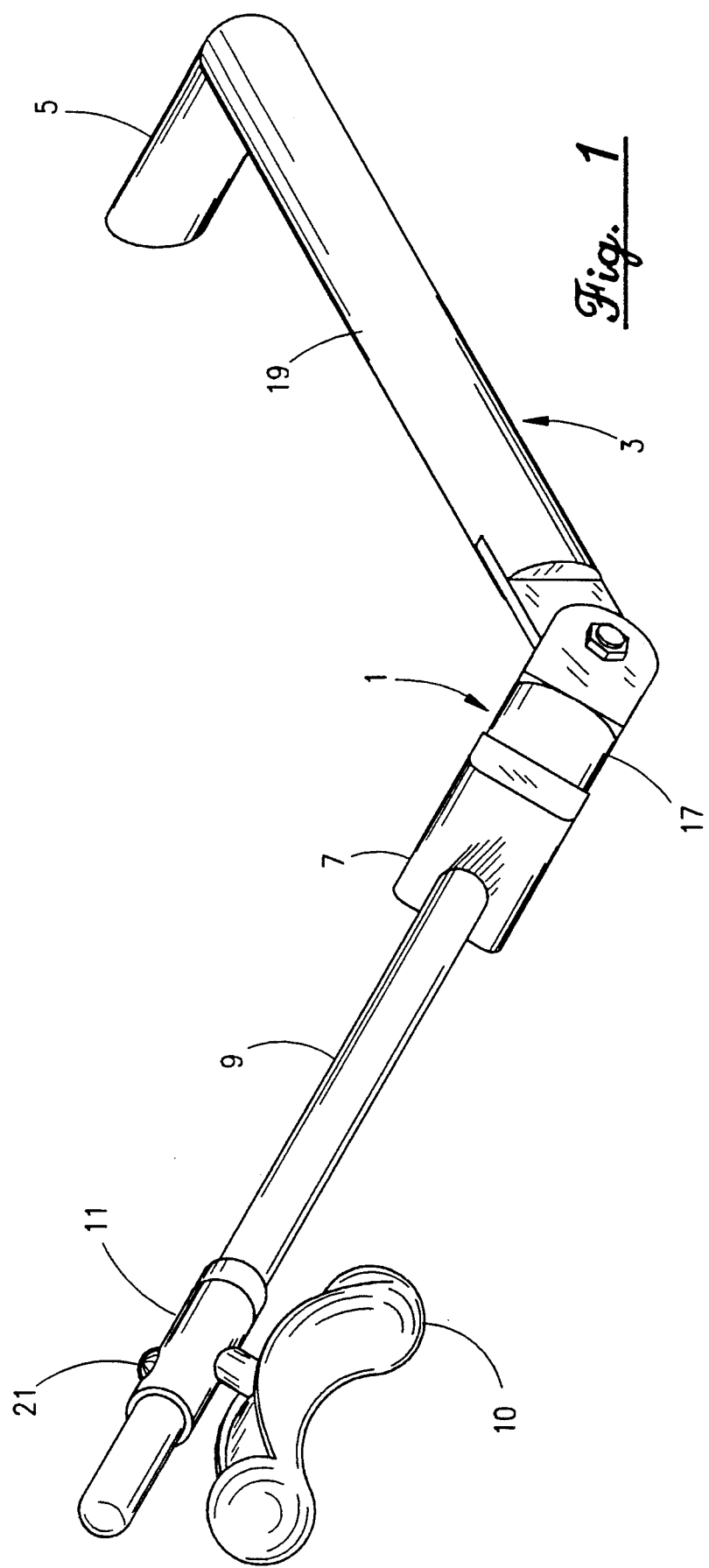
FIG. 1 is an isometric view of the present invention.
Figure 5:
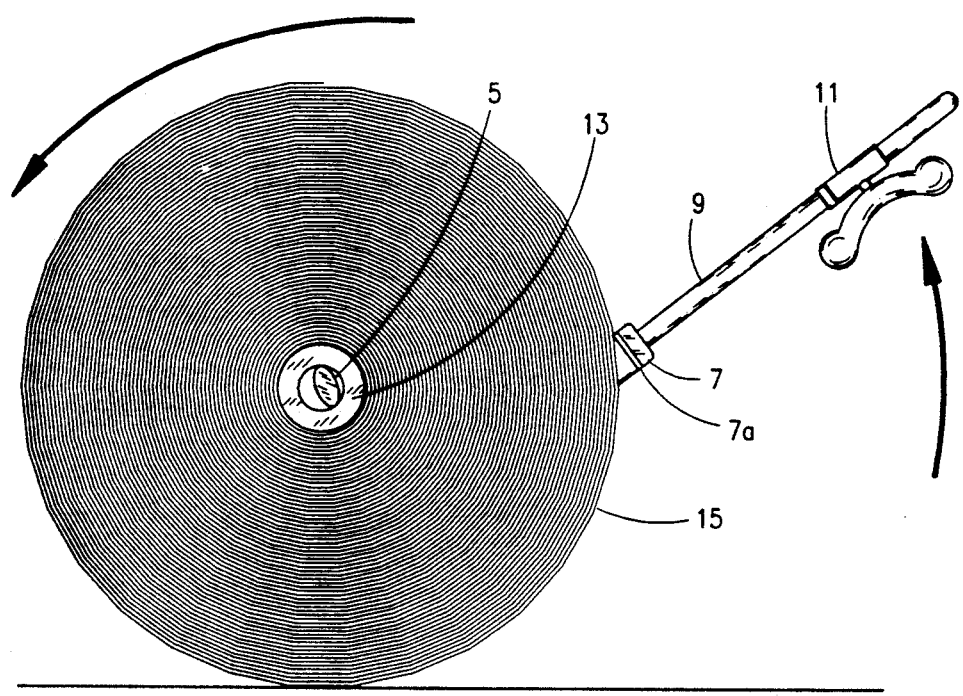
FIG. 5 is a left side elevation view of the present invention employed on the right end of a stratified roll of material.
Figure 6:
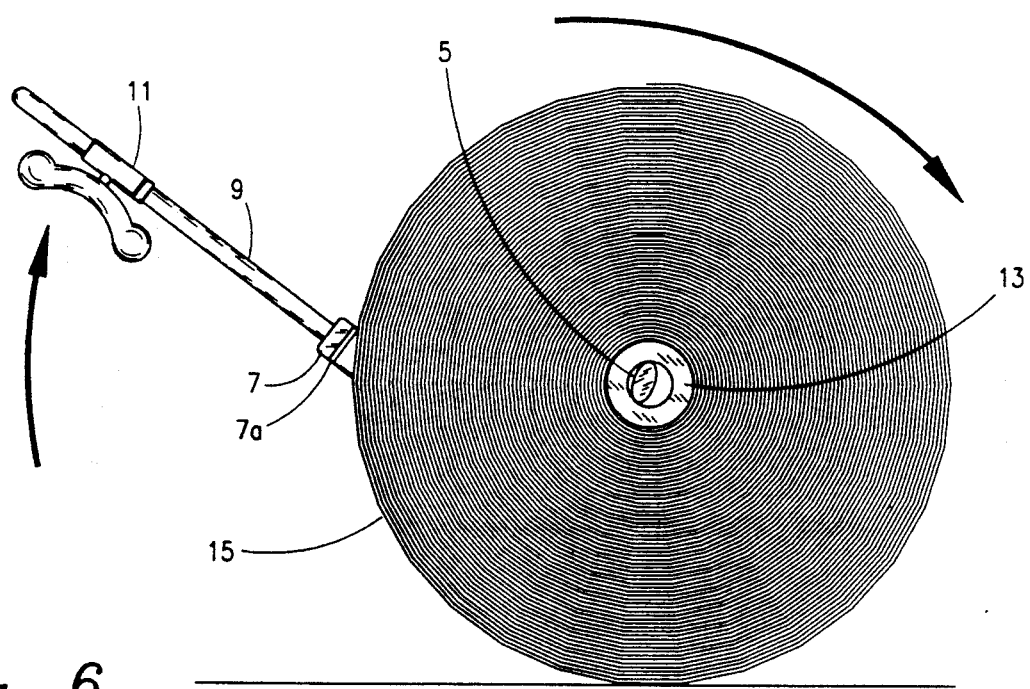
FIG. 6 is a right side elevation view of the present invention employed on the left end of a stratified roll of material.

As seen in FIG. 1–3, the roll positioning tool 1 comprises an articulated bar assembly 3 with a perpendicular member 5, 7 at each end, a handlebar 9 protruding from the uppermost perpendicular member 7 and a rotatable shoulder stock 11. The perpendicular member 5 located at the articulated bar assembly's 3 lower longer portion is configured in a manner that will accommodate the roll core's 13 requirement for a slip fit. The perpendicular member 7 located at the articulated bar assembly's 3 upper shorter portion may be configured to fit the curvature of the mass or roll 15 and fitted with detachable rubber cleats 72 as seen in FIG. 2a or the like or simply utilize a pair of right angle corners along its lower edges as shown in FIGS. 1 and 4. The upper portion 17 and lower portion 19 of the articulated bar should be of the same size in order to provide a smooth transition across the articulated joint 25 which is pivotal about a flat headed shoulder pin 27 secured by a castle nut 29. Thus, there are to sharp edges to hang on the ends of stratified rolls 15. The lever or handlebar 9 extending from the upper portion's 17 perpendicular member 7 should be of sufficient length to provide the leverage required to move and position the mass 15. It is important to note that the handlebar 9 is offset from the center line of the articulated bar 3 to provide stability. It is often desirable to install a padded 10 rotatable shoulder stock 11, whereby the user can apply his whole body force to the handle or lever 9. The user can control the rotation of the mass 15 by simply applying force in the opposite direction if necessary. If the roll is exceptionally long, two tools 1 may be employed, one on each end. From time to time, it may become necessary to switch the tool 1 to the opposite end of the roll or mass 15 being moved. Therefore, the tool 1, being reversible, is simply moved to the opposite end, as seen in FIGS. 5 and 6, and the shoulder stock 11, if used at all, is rotated to the opposite side, as seen in FIG. 3, by releasing the lock pin 21. The articulation joint 25 of the articulate bar assembly 3 should be devoid of excess slack to reduce the chance of shear and warpage. Therefore, bearing washers 23 made of such material as nylon or the like are often employed within the joint 25. All components with the exception of the clevis joint portion 25 of the articulated bar assembly 3 may be constructed of hollow structural shapes, provided they are of sufficient cross section to prevent bending when applied to the load mass 15.

The tool 1 provides a handy means for rolling such stratified materials 15. It is weight and economical. Therefore, it can be supplied in large numbers so that it is readily accessible to the workman. The tool 1 is used by inserting the insertion member 5 into the central core of the mass 15. By doing so, the upper portion cleat 7 is automatically arranged to engage the outer perimeter of the mass 15, as seen in FIG. 4, when the articulation joint 25 is rotated. The tool's 1 handle/lever 9 is used to rotate the mass 15 by a series of ratcheting movements.

While only the best-known embodiment of the invention has been illustrated and described herein, it will be understood that the invention is not limited thereto or thereby. Reference should be made to the appended claims in determining the true scope of the invention.

What is claimed is:

1. A manually articulated tool for rolling and positioning a diametrical mass having a central core comprising:
    a) a lower bar, having a mitered insertion member at a right angle to one end, for insertion into the central core of a diametrical mass;
    b) an eyelet member, attached to the opposite end of said lower bar;
    c) an upper bar, having a clevis member attached to one end;
    d) a pivot pin for coupling said clevis and said eyelet members;
    e) a cleat member, attached to the opposite end of said upper bar at a right angle, parallel to said insertion member, for gripping the outer periphery of said diametrical mass; and
    (f) a lever, attached perpendicular to said cleat member, offset from and parallel to said upper bar, for pivoting said articulated tool.

2. A manually articulated tool for rolling and positioning a diametrical mass according to claim 1 wherein said lower bar is an oval tube.

3. A manually articulated tool for rolling and positioning a diametrical mass according to claim 2 wherein said pivot pin is a fabricated shoulder bolt and nut arrangement, the head of which is flush with said clevis member.

4. A manually articulated tool for rolling and positioning a diametrical mass according to claim 3 wherein said cleat member is fitted with a detachable cleat means.

5. A manually articulated tool for rolling and positioning a diametrical mass according to claim 4 wherein said lever is fitted with a padded rotatable shoulder stock means.

6. A manual tool for rolling and positioning a roll of stratified material having a central core comprising:
    a) an articulated bar;
    b) a perpendicular insertion member, located at one end of said articulated bar;
    c) a perpendicular cleat member, parallel to said insertion member located at the opposite end of said articulated bar;
    d) a lever, attached to said cleat member, for pivoting said articulated bar; and
    e) a shoulder stock means, rotatably attached to said lever.

7. A manual tool for rolling and positioning a roll of stratified material having a central core according to claim 6 wherein said articulated bar's articulation is derived by a clevis arrangement comprising a forked end, eye end and a pivot pin therein.

8. A manual tool for rolling and positioning a roll of stratified material having a central core according to claim 7 wherein said articulated bar and perpendicular insertion member are constructed from oval shaped tubing.

9. A manual tool for rolling and positioning a roll of stratified material having a central core according to claim 8 wherein said perpendicular cleat member is fitted with a detachable cleat means.

10. A manual tool for rolling and positioning a roll of stratified material having a central core according to claim 9 wherein said lever is offset from and parallel to the vertical axis of said articulated bar.

11. A method of rolling and positioning a roll of stratified material having a central core comprising the steps of;
    a) inserting, into the central core of a roll of stratified material, a tool comprising; an articulated bar having, a perpendicular insertion member at one end; a cleat member parallel to said insertion member at the opposite end; and a lever attached to said cleat member, perpendicular to and offset from the vertical axis of said articulated bar;
    b) rotating, said lever until one edge of said cleat member engages the outer perimeter of said roll;
    c) applying, leverage to said lever until said roll rotates and thereby translates said roll across a planar surface;
    d) disengaging, said roll by rotating said insertion member within said roll's core;
    e) taking, up a new position on said roll's outer perimeter; and
    f) reengaging, said cleat member and thereby continuing to move said roll of stratified material in a ratcheting manner.

* * * * *